Sept. 18, 1962 M. E. A. HERMANS ETAL 3,054,738
PROCESS OF NUCLEAR FISSION
Filed Dec. 14, 1956
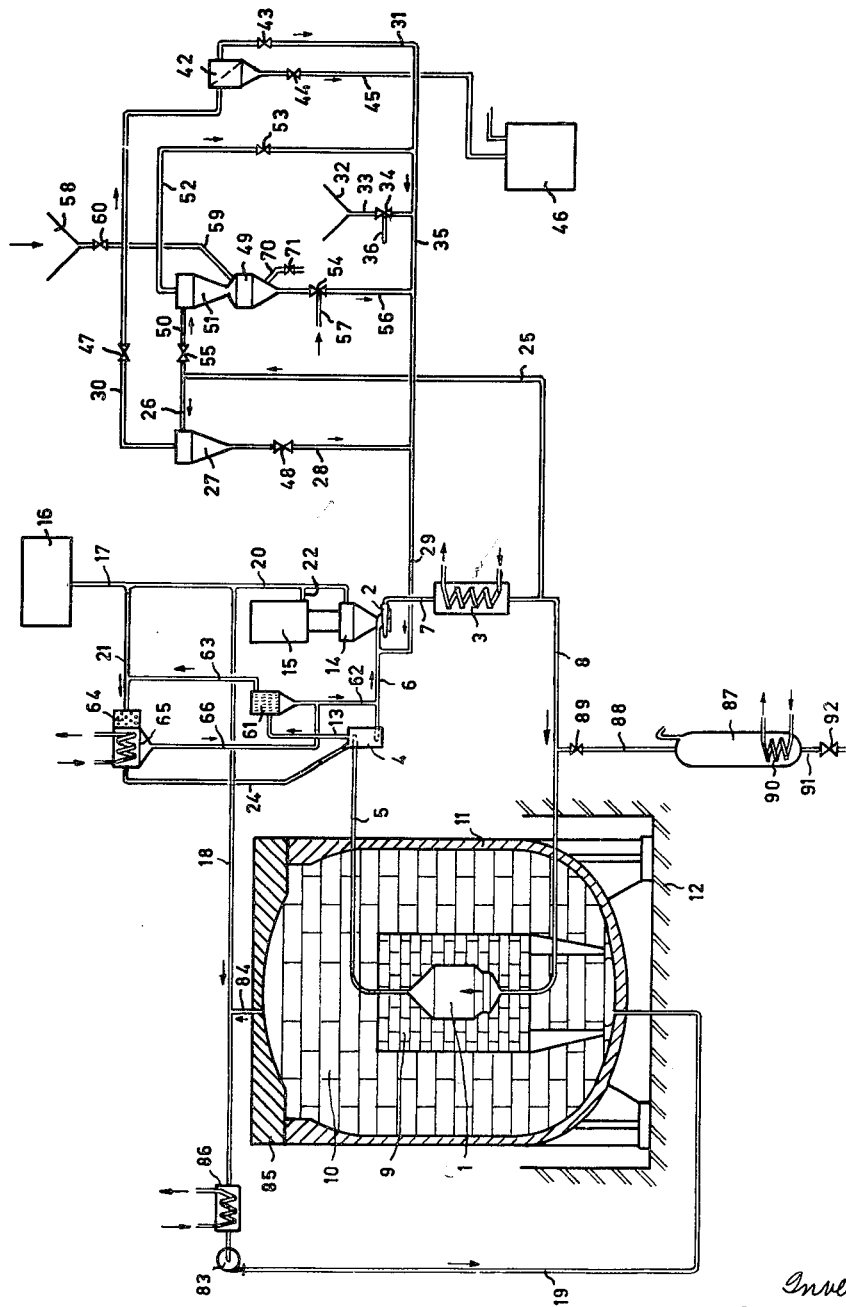
Inventors
Marie A. E. Hermans
Theo Van der Plas
By Cushman, Darby & Cushman
Attorneys

United States Patent Office 3,054,738
Patented Sept. 18, 1962

3,054,738
PROCESS OF NUCLEAR FISSION
Marie E. A. Hermans and Theo van der Plas, Arnhem, Netherlands, assignors to Stichting Reactor Centrum Nederland, The Hague, Netherlands
Filed Dec. 14, 1956, Ser. No. 628,440
Claims priority, application Netherlands Dec. 21, 1955
15 Claims. (Cl. 204—154.2)

The present invention relates to a process for the establishment of a self-sustaining neutron chain nuclear fission reaction in a system comprising a nuclear fuel consisting of a suspension of particles of solid fissile material, e.g., uranium oxide or thorium oxide, in a carrier liquid of low neutron capture cross section, which suspension circulates through a nuclear reactor wherein critical conditions prevail and through an external flow system including a heat exchanger, in which system non-critical conditions prevail while during the operation of the nuclear reactor fission products are regularly removed, so that poisoning by atoms which strongly absorb neutrons is maintained at a low level.

In a known realization of the aforementioned process the removal of fission products during the operation of the nuclear reactor is obtained by continuously separating from at least part of the circulating suspension, at least part of the carrier liquid, purifying the carrier liquid thus separated with suitable means, e.g., ion exchangers or adsorbents, and resupplying the carrier liquid thus purified to the circulating suspension.

In this connection it has furthermore already been proposed to continuously dilute the circulating suspension, after this has emerged from the nuclear reactor, with an additional amount of carrier liquid, which additional amount is subsequently separated from the diluted suspension, purified with suitable means and then used again for diluting the suspension emerging from the nuclear reactor.

The known processes are based on the insight that a substantial part of the fission products formed in the nuclear fission reaction leave the suspended fissile material particles and are subsequently slowed down by and detained in the carrier liquid, so that they may be removed from the nuclear fuel loop by separation and subsequent purification of at least part of the carrier liquid from the circulating suspension. It was furthermore already known that, if a suspension of fissile material is used, in which substantially all the suspended particles have a maximum diameter that is smaller than $15\mu$, the amount of fission products detained in the carrier liquid is maximal, and consequently, the efficiency of the removal of fission products during the operation of the nuclear reactor as herein described is likewise maximal.

However, the known processes have the disadvantage that a considerable portion of the fission products detained in the carrier liquid are adsorbed by the suspended particles of the fissile material, so that the possibility of removal is limited. The fission products which have been thus adsorbed exert the same detrimental influence on the neutron economy as do the fission products that have not left the suspended particles.

It is the main object of the present invention to provide a process of the kind specified permitting an improved efficiency of removal of fission products during operation of the nuclear reactor.

It is a further object of the invention to provide a process of the kind specified in which the means for removing fission products from the circulating suspension are of a very simple and efficient nature.

Further objects and the entire scope of applicability of the invention will become apparent from the detailed description and examples given hereinafter, in the annexed drawing and in the appertaining claims. It should be understood, however, that the detailed description and annexes are given by way of illustration and not of limitation.

According to the invention, there is added to the circulating suspension such an amount of a material adsorbing fission products that are detained in the carrier liquid, that the fission-products adsorption capacity of the said material per unit volume of suspension is significantly greater than the fission-products adsorption capacity of the fissile material per unit volume of suspension, whereas fission products are removed from the circulating suspension during operation of the nuclear reactor by separating—whether or not continuously— adsorbing material from the circulating suspension, and adding fresh adsorbing material to the suspension to replace the adsorbing material removed.

The invention is based on the insight that the adsorbing material added to the circulating suspension will adsorb the greater part of the fission products detained in the carrier liquid, so that the amount of fission products adsorbed by the suspended fissile material particles is restricted to a minimum, while furthermore the fission products may be removed in a simple and efficient manner.

The adsorbing material to be used should, like all other substances to be employed within the critical region of a nuclear reactor, satisfy the requirement that it have a low neutron absorption capacity.

Preferably, a granular solid material, e.g., consisting of active carbon, is used as the fission products adsorbing material in the process according to the invention.

For the periodical or continuous separation of the solid adsorbing material particles charged with fission products from the circulating suspension use may be made of processes known per se for the separation of mixtures of solids suspended in a liquid. In view of the very high specific gravity of the fissile materials normally used, such as uranium oxide and thorium oxide, this will generally involve a separation according to specific gravity which does not present special difficulties.

By preference the separation of the adsorbing material particles from the circulating suspension is effected by feeding, in a secondary circuit, at least part of that suspension to at least one hydrocyclone. The overflow fraction from this hydrocyclone consists of carrier liquid in which, almost exclusively, adsorbing material particles are suspended, and the underflow fraction consists of carrier liquid in which, nearly exclusively, fissile material particles are suspended. After separation of the adsorbing material, e.g. by means of a filter, the carrier liquid from the overflow fraction, which is now free of solid matter, may be returned into the suspension circuit, as well as the underflow fraction comprising a slightly thickened nuclear fuel suspension.

The preferred choice of active carbon as the adsorbing material is based on the fact that while it has been found that although the specific fission-products adsorption capacity per unit surface area of active carbon is only of the same order as that of such fissile materials as uranium oxide and thorium oxide, the accessible adsorbing surface area of active carbon particles is very much larger than the accessible adsorbing surface area of particles of the said fissile materials of a similar or even larger size so that, when a mixture of particles of the two substances is present in the carrier liquid, the establishment of the adsorption equilibria of the fission products leads to a practically complete adsorption by the active carbon, even if the active carbon particles are present in a small amount as compared with the amount of fissile material particles simultaneously present in a given volume of the suspension.

When active carbon of the best quality available is used as the fission products adsorbing material according to the invention, only very small quantities thereof are needed. It has been found, e.g., that when a nuclear fuel suspension of uranium dioxide with a mean particle diameter of 8–15$\mu$ in common or heavy water is used, the presence in the circulating suspension of a mean quantity of active carbon not greater than 2 grammes per kilogramme of uranium dioxide already effects an extreme adsorption of the fission products by the active carbon. In this case active carbon having a mean particle diameter of 2$\mu$ may be advantageously utilized.

The great difference in specific gravity between the fissile material and active carbon permits of a wide choice of particle sizes of the active carbon. If so desired, the particles of active carbon may be considerably bigger than the particles of fissile material, without fear of any difficulties in the separation of the active carbon from the circulating suspension by means of specific gravity separation.

The invention will be further illustrated with reference to the drawing, which shows an operative nuclear reactor assembly suited for realizing the process according to the invention.

In the drawing, a reactor vessel 1 is connected with a primary circuit for the nuclear fuel suspension containing adsorbing material, which circuit is composed of a pump 2, a heat exchanger 3, a gas separator 4 and connective conduits 5, 6, 7 and 8; the suspension circulation is clockwise. The reactor vessel 1 is surrounded by a pile 9 of beryllium oxide bricks, which is further embedded in a pile 10 of graphite bricks. The nuclear reactor proper is enclosed in a pressure tight vessel 11 which in its turn is arranged within a protective shield 12 consisting of concrete.

When the nuclear fuel suspension, e.g., consisting of solid uranium oxide particles in water as the carrier liquid is circulated in the manner indicated, critical conditions for a self-sustaining neutron chain fission reaction will prevail within the reactor vessel 1 as a consequence of the neutron-moderating properties of the suspension carrier liquid, the neutron-moderating and neutron-reflecting properties of the beryllium oxide pile 9, and the neutron-reflecting and neutron-moderating properties of the graphite pile 10. In the circulation system external of the nuclear reactor proper conditions are non-critical.

In the heat exchanger 3 the suspension, which has become hot as a result of the nuclear fission reaction, gives off heat to a coolant and the energy recovered in this way may be subsequently utilized in a power-generating plant (not shown in the drawing).

In the gas separator 4, which is of the centrifugal type, the gaseous radiolysis products of the carrier liquid, e.g., in the case of common water as the carrier liquid, hydrogen and oxygen, are separated from the circulating suspension after which they are led through conduits 13, 63 and 21 and over a moisture separator 61 to a catalytic cell 64, where they are recombined to common or heavy water, as the case may be, which water is condensed in an adjoining condensor 65 and is returned through conduits 66 and 62 into the primary suspension circuit, together with the water separated out in the moisture separator 61.

The primary suspension circuit comprises an expansion vessel 14, which is located immediately over the pump 2, which is operated by motor 15. Pump 2 is of the centrifugal type, so that, if some liquid would enter the expansion vessel 14, no suspended particles will enter said vessel, on account whereof an accumulation of radioactive material within expansion vessel 14 is avoided.

In view of the fact that the nuclear reactor must be capable of operating at elevated temperatures, e.g. at 250° C., the whole system is subjected to gas pressure in order to prevent boiling of the carrier liquid. To this end a source 16 for the supply of gas under pressure is connected by means of conduits 17, 21 and 24 with the gas separator 4 and, by means of conduits 17 and 20, with the expansion vessel 14. In order to prevent leakage of the strongly radio-active circulating suspension, the gas source 16 is moreover connected with the interior of the pressure vessel 11, by means of conduits 17, 18 and 19, and with the casing of motor 15, by means of conduits 17, 20 and 22.

The said gas is used moveover for cooling the pile of beryllium oxide bricks 9 and the pile of graphite bricks 10. To this end, the interior of the pressure vessel 11 is connected to conduit 18 by means of a conduit 84 which is passed through the cover 85 of the pressure vessel 11. By means of a pump 83 circulation of gas through the interior of pressure vessel 11 and through conduits 18 and 19 is effected. The gas thus circulated is cooled by means of a cooler 86.

The gas supplied from source 16 is preferably hydrogen when the carrier liquid of the nuclear fuel suspension is common water, and deuterium when the carrier liquid is heavy water. The catalytic recombination in cell 64 is then promoted by the presence of an excess amount of hydrogen or deuterium, respectively, and, on the other hand, the radiolysis of the carrier liquid is repressed, as the suspension is saturated with hydrogen or deuterium, respectively. It has been found, namely, that the position of the equilibria of the various possible decomposition reactions of common or heavy water, as far as the gaseous reaction components are concerned, is mainly determined by the hydrogen or, respectively, the deuterium concentration.

The separation from the circulating suspension of adsorbing material particles charged with adsorbed fission products according to the invention is achieved by feeding part of said suspension through conduits 25 and 26 to a hydrocyclone 27. The overflow fraction from this hydrocyclone, which consists of carrier liquid and of substantially all adsorbing material particles from that portion of the suspension which has been fed to the hydrocyclone, flows through conduit 30 to a filter 42, where the adsorbing material particles is separated off. The carrier liquid freed of adsorbing material particles sussequently flows through conduits 31, 35 and 29 back into the primary suspension circuit, as does the underflow fraction from hydrocyclone 27, which consists of carrier liquid and substantially all fissile material particles from the suspension fed to hydrocyclone 27, which underflow fraction through conduits 28 and 29, returns to the primary suspension circuit.

With a continuous process according to the invention a fixed volume fraction of the circulating suspension flows at any moment through the secondary circuit thus formed.

In a discontinuous process a greater volume fraction of the suspension is periodically led through the secondary circuit, so that within a short time the whole amount of suspension is freed of the adsorbing material charged with adsorbed fission products.

The volume fraction of the suspension fed to hydrocyclone 27, which is a measure of the amount of adsorbing material separated out per unit time, as well as the operation of the said hydrocyclone can be controlled by means of control valves 48, in conduit 28, and 47, in conduit 30.

Fresh adsorbing material to replace the material separated off in the filter 42, is added to the circulating suspension by introducing it into the carrier liquid flowing through conduit 35, by means of hopper 32 and conduit 33 with control valve 34. The adsorbing material to be added is to this end preferably suspended in a small quantity of carrier liquid. If necessary, an extra amount of carrier liquid may be supplied through conduit 36.

The adsorbing material separated out in filter 42 is periodically washed away through conduit 45 to the storage tank 46. To this end control valve 43 in conduit 31 is closed for a short time and control valve 44 in conduit 45 simultaneously opened. Carrier liquid which is to replace the carrier liquid which in this operation is bled into vessel 46 may be supplied through conduits 36 and 33.

It should be remarked that filter 42 may also serve to remove very fine particles of fissile material, which have been formed in the flowing suspension by attrition and which, owing to their very small size, likewise get into the overflow fraction of hydrocyclone 27.

In order that part of the fissile material may be removed from the circulating suspension and/or that fissile or fertile material may be added thereto, the apparatus is provided with a storage tank 49 into which open a hydrocyclone 51 and a feed conduit 59. Part of the circulating suspension may be fed through conduits 25 and 50, with control valve 55, to hydrocyclone 51, for the removal of fissile material. In this case thickened suspension issues as the underflow fraction from hydrocyclone 51 and enters the storage tank 49, while carrier liquid which may also contain absorbing material, issues as the overflow fraction from hydrocyclone 51 and subsequently returns to the primary suspension circuit through conduits 52, 35 and 29. The operation of hydrocyclone 51 may be controlled by means of control valve 53 in overflow conduit 52. Fresh fissile or fertile material may be introduced into storage tank 49 by means of hopper 58 and feed conduit 59 with control valve 60. From storage tank 49 material may be returned or fed into the primary suspension circuit through conduits 56 and 29, by opening control valve 54. If necessary, an extra amount of carrier liquid may be supplied through conduit 57. Material may be drained from tank 49 through conduit 70 provided with control valve 71.

In case of emergency, the inventory of the nuclear fuel suspension circuit may be rapidly drained into dump tank 87, through conduit 88 by operating control valve 89. This dump tank is so dimensioned that, when it is filled with nuclear fuel suspension, no critical conditions for a self-sustaining neutron chain fission reaction prevail therein. By means of a cooler 90 heat which is as yet generated in the suspension as a result of the action of delayed neutrons, may be carried off. The vessel 87 may be emptied through conduit 91 by operating control valve 92.

Separate control measures need not be taken with the nuclear reactor assembly shown, as the process is self-regulating; a rise in the temperature as a consequence of a power surge will entail a decrease of the density of the carrier liquid, i.e. the moderator owing to expansion of the carrier liquid, so that, automatically, the thermal neutron flux decreases and the nuclear fission reaction is curtailed.

Example I

In a nuclear reactor assembly as shown in the drawing a sulf-sustaining nuclear fission reaction was effected, in which the nuclear fuel consisted of a suspension of 5 kg. of granular uranium dioxide, having a mean particle diameter of $8\mu$, in 28 kg. of common water. The $U^{235}$ content of the fissile material was 20%. The capacity of the primary suspension circuit, reactor vessel 1 inclusive, was 28 litres, that of the secondary suspension circuit 1 litre. The rate at which suspension circulated through the primary circuit was 1.6 litres per second.

The mean thickness of the pile of BeO bricks 9 was 20 cm., that of the pile of graphite bricks 10 was 35 cm.

The gas from pressure source 16 was hydrogen, pressure 60 atm. gauge.

The maximum operating temperature within the critical region in the reactor vessel 1 was 250° C., the energy production was 500 kw.

According to the invention, a mean amount of granular active carbon (mean particle diameter $2\mu$) of 2 grammes per kilogramme of $UO_2$ was present in the suspension of nuclear fuel.

The rate at which the suspension circulated through the secondary circuit was 20 ml./sec., so that, continuously, an amount of active carbon particles charged with fission products of 0.125 gramme per second was separated in filter 42. An equal amount of fresh active carbon particles were introduced into the suspension circuit by means of the feeding device 32—33.

The amount of fission products retained in the fissile material particles appear to be 4 parts per million, which means that the neutron poisoning was reduced by 80% by the application of the invention.

Example II

The same result as stated in Example I could be obtained in a similar case by using a secondary suspension circuit with a capacity of 5 litres and rapidly separating every 40 minutes the whole quantity of active carbon particles from the circulating suspension, simultaneously replacing it by fresh active carbon particles.

Example III

Essential data applying to the use of the nuclear reactor assembly according to the drawing:

Fissile material: 8000 kg. of thorium dioxide, containing 1.5% $U^{233}$, mean particle diameter $8\mu$;
Carrier liquid: 22,000 kg. of heavy water;
Capacity of primary suspension circuit: 20 cubic metres;
Rate at which suspension circulates through primary circuit: 1 cubic metre per second;
Gas from pressure source 16: Deuterium, pressure 60 atm. gauge;
Maximum operating temperature: 250° C.;
Maximum energy production: 300 megawatts;
Adsorbing material: Granular silica gel, mean particle diameter $2\mu$, concentration 4 grammes per kilogramme of $ThO_2$;
Volume of secondary suspension circuit: 300 litres;
Rate at which suspension circulates through secondary circuit: 12.5 litres/sec.;
Amount of adsorbing material continuously removed and replaced per second: 40 grammes.

The amount of fission products retained in the fissile material particles was only 0.25 part per million, which means a reduction of the neutron poisoning by 80%.

We claim:

1. In a process for the establishment of a self-sustaining neutron chain nuclear fission reaction in a system comprising a nuclear fuel suspension of solid fissile material particles in water, which suspension continuously circulates through a nuclear reactor wherein critical conditions prevail and through an external circulation system including a heat exchanger, in which latter system non-critical conditions prevail, whereas during the operation of the nuclear reactor fission products are regularly removed from the circulating nuclear fuel suspension, the improvement comprising adding to the circulating suspension such an amount of a granular solid material and having a specific gravity sufficiently lower than that of the fissile material to permit separation according to specific gravity and adsorbing fission products that are detained in the water that the fission products adsorption capacity of the said material per unit volume of suspension is significantly greater than the fission products adsorption capacity of the fissile material per unit volume of suspension, removing fission products by separating adsorbing material charged with fission products from the circulating suspension, said separation being accomplished by means of the difference in specific gravity of said granular solid material and said fissile material, and adding fresh adsorbing material to the circulating suspension to replace the separated adsorbing material.

2. Process according to claim 1, wherein continuously part of the adsorbing material is separated from at least part of the circulating suspension.

3. Process according to claim 1, wherein the separation of solid adsorbing material particles from the circulating suspension is effected by feeding at least part of said suspension to at least one hydrocyclone, separating from the overflow fraction of the said hydrocyclone the solid material and supplying the water thus freed of solid material, as well as the underflow fraction of the hydrocyclone, to the suspension circuit.

4. Process according to claim 1, wherein the adsorbing material consists of granular active carbon.

5. In a process for the establishment of a self-sustaining neutron chain nuclear fission reaction in a system comprising a nuclear fuel suspension of solid uranium dioxide in water, having a mean particle diameter of 8–15$\mu$, which suspension continuously circulates through a nuclear reactor wherein critical conditions prevail and through an external circulation system including a heat exchanger in which latter system non-critical conditions prevail, whereas during the operation of the nuclear reactor fission products are regularly removed from the circulating suspension, the improvement comprising adding to the circulating suspension an amount of granular active carbon not greater than 2 grammes per kilogramme of uranium dioxide, removing fission products by separating active carbon charged with fission products from the circulating suspension and adding fresh active carbon to the circulating suspension to replace the separated active carbon.

6. Process according to claim 5, wherein the mean particle diameter of the granular active carbon is 2$\mu$.

7. Process according to claim 5, wherein the active carbon is separated off and replaced at a rate of 0.125 gramme per second.

8. A process for the establishment of a self-sustaining neutron chain nuclear fission reaction in a system comprising a nuclear fuel suspension of 5 kg. of granular uranium dioxide having a mean particle diameter of 8$\mu$ in 28 kg. of common water, said uranium dioxide having a $U^{235}$ content of 20%, said suspension continuously circulating in a primary suspension circuit through a nuclear reactor in which critical conditions prevail, said primary suspension circuit having a capacity of 28 l. and through an external secondary circulation system having a capacity of 1 l. and including a heat exchanger in which latter system non-critical conditions prevail, the rate at which the suspension circulates through the primary circuit being 1.6 l./sec. and the rate at which the suspension circulates through the secondary circulation system being 20 ml./sec., the entire system being under hydrogen gas pressure of 60 atm. gauge, the maximum operating temperature within the reactor wherein critical conditions prevail being 250° C., and removing nuclear reactor fission products by adding to the circulating suspension an amount of granular active carbon of mean particle diameter 2$\mu$ of 2 g. per kg. of uranium dioxide and removing fission products by separating active carbon particles at a rate of 0.125 g./sec. from the circulating suspension and adding fresh active carbon to the circulating suspension to replace the separated active carbon.

9. A process for the establishment of a self-sustaining neutron chain nuclear fission reaction in a system comprising a nuclear fuel suspension of 8000 kg. of thorium dioxide containing 1.5% $U^{233}$ having a means particle diameter of 8$\mu$ in 22,000 kg. of heavy water, said suspension continuously circulating in a primary suspension circuit through a nuclear reactor in which critical conditions prevail, said primary suspension circuit having a capacity of 20 cubic meters, and through an external secondary circulation system having a capacity of 300 l. and including a heat exchanger in which latter system non-critical conditions prevail, the rate at which the suspension circulates through the primary circuit being 1 cubic meter/sec. and the rate at which the suspension circulates through the secondary circulation system being 12.5 l./sec., the entire system being under deuterium gas pressure of 60 atm. gauge, the maximum operating temperature within the reactor wherein critical conditions prevail being 250° C., and removing nuclear reactor fission products by adding to the circulating suspension an amount of granular silica gel of mean particle diameter of 2$\mu$ of 4 g. per kg. of thorium dioxide and removing fission products by separating active carbon particles at a rate of 40 g./sec. from the circulating suspension and adding fresh active carbon to the circulating suspension to replace the separated active carbon.

10. A process according to claim 1 wherein the liquid is heavy water.

11. A process according to claim 1 wherein the liquid is common water and wherein the nuclear fuel is enriched in $U^{235}$.

12. In a process for the establishment of a self-sustaining neutron chain nuclear fission reaction in a system comprising a nuclear fuel suspension of solid fissile material particles in water, which suspension continuously circulates through a nuclear reactor wherein critical conditions prevail and through an external circulation system including a heat exchanger, in which latter system noncritical conditions prevail, whereas during the operation of the nuclear reactor fission products are regularly removed from the circulating nuclear fuel suspension, the improvement comprising adding to the circulating suspension such an amount of a solid material selected from the group consisting of granular active carbon and granular silica adsorbing fission products that are detained in the water that the fission products' adsorption capacity of the said material per unit volume of suspension is significantly greater than the fission products' adsorption capacity of the fissile material per unit volume of suspension, removing fission products by separating adsorbing material charged with fission products from the circulating suspension and adding fresh adsorbing material to the circulating suspension to replace the separated adsorbing material.

13. A process according to claim 12 wherein the water is heavy water.

14. A process according to claim 12 wherein the water is common water and wherein the nuclear fuel is enriched in $U^{235}$.

15. A process according to claim 12 wherein the adsorbing material consists of granular active carbon.

References Cited in the file of this patent

UNITED STATES PATENTS

| | | |
|---|---|---|
| 2,708,656 | Fermi et al. | May 17, 1955 |
| 2,840,522 | Young et al. | June 24, 1958 |
| 2,860,093 | Wegner et al. | Nov. 11, 1958 |

FOREIGN PATENTS

| | | |
|---|---|---|
| 167,674 | Australia | May 17, 1956 |

OTHER REFERENCES

Proceedings of the International Conference on the Peaceful Uses of Atomic Energy, vol. 3, United Nations, N.Y., 1955. Held in Geneva, Aug. 8–20, 1955, pp. 116–120, 131.